(12) United States Patent
Hammerschmidt

(10) Patent No.: US 11,698,631 B2
(45) Date of Patent: Jul. 11, 2023

(54) TESTING A CRASH SENSOR DEVICE DURING VEHICLE OPERATION

(71) Applicant: Infineon Technologies AG, Neubiberg (DE)

(72) Inventor: Dirk Hammerschmidt, Finkenstein (AT)

(73) Assignee: Infineon Technologies AG, Neubiberg (DE)

( * ) Notice: Subject to any disclaimer, the term of this patent is extended or adjusted under 35 U.S.C. 154(b) by 551 days.

(21) Appl. No.: 16/869,633

(22) Filed: May 8, 2020

(65) Prior Publication Data

US 2020/0264596 A1   Aug. 20, 2020

Related U.S. Application Data

(62) Division of application No. 15/491,292, filed on Apr. 19, 2017, now Pat. No. 10,671,062.

(51) Int. Cl.
| | | |
|---|---|---|
| *G05B 23/02* | (2006.01) | |
| *G01D 3/08* | (2006.01) | |
| *G05B 9/03* | (2006.01) | |
| *B60R 21/013* | (2006.01) | |

(52) U.S. Cl.
CPC ........... *G05B 23/0256* (2013.01); *G01D 3/08* (2013.01); *G05B 9/03* (2013.01); *G05B 23/0213* (2013.01); *B60R 21/013* (2013.01)

(58) Field of Classification Search
CPC .. G05B 23/0256; G05B 9/03; G05B 23/0213; G01D 3/08; G01D 18/00; B60R 21/013
See application file for complete search history.

(56) References Cited

U.S. PATENT DOCUMENTS

| | | | |
|---|---|---|---|
| 4,654,846 A * | 3/1987 | Goodwin | G06F 11/20 714/13 |
| 5,835,873 A | 11/1998 | Darby et al. | |
| 6,530,597 B1 | 3/2003 | Nesper et al. | |
| 9,102,220 B2 | 8/2015 | Breed | |
| 9,738,125 B1 | 8/2017 | Brickley et al. | |
| 2001/0009337 A1 | 7/2001 | Ueno et al. | |
| 2004/0199364 A1* | 10/2004 | Law | G05B 23/0256 702/189 |
| 2006/0232052 A1 | 10/2006 | Breed | |
| 2007/0150136 A1* | 6/2007 | Doll | B60T 8/885 701/29.2 |

(Continued)

FOREIGN PATENT DOCUMENTS

| | | |
|---|---|---|
| CN | 1262747 A | 6/2000 |
| CN | 1981251 A | 6/2007 |
| JP | 2014207807 A | 10/2014 |

*Primary Examiner* — Robert E Fennema
*Assistant Examiner* — Christopher W Carter
(74) *Attorney, Agent, or Firm* — Harrity & Harrity, LLP

(57) ABSTRACT

A crash sensor device may include multiple sensor components positioned along one or more data paths to a communication interface of the crash sensor device. The crash sensor device may include a test control unit. The test control unit may receive a test command from an electronic control unit during operation of a vehicle. The test control unit may perform a test of one or more sensor components, of the multiple sensor components, during operation of the vehicle based on the test command. The test control unit may output a test result to the electronic control unit based on performing the test.

20 Claims, 6 Drawing Sheets

(56) References Cited

U.S. PATENT DOCUMENTS

| | | |
|---|---|---|
| 2008/0039957 A1 | 2/2008 | Hoseinnezhad |
| 2008/0312889 A1 | 12/2008 | Maier et al. |
| 2010/0023205 A1* | 1/2010 | Schmitt ............... B60W 50/045 701/29.2 |
| 2010/0229038 A1 | 9/2010 | Mayer et al. |
| 2011/0066319 A1* | 3/2011 | Bechtler ................ B60T 8/885 701/29.2 |
| 2011/0144866 A1 | 6/2011 | Maier |
| 2011/0153164 A1 | 6/2011 | Hiemer et al. |
| 2014/0088736 A1 | 3/2014 | Cohen |
| 2017/0206777 A1 | 7/2017 | Nishida |
| 2017/0313332 A1 | 11/2017 | Paget et al. |
| 2018/0171799 A1* | 6/2018 | Moberg ................ E21D 9/1093 |
| 2018/0290642 A1* | 10/2018 | Tschiene ................ B60T 8/885 |
| 2018/0307220 A1 | 10/2018 | Hammerschmidt et al. |

\* cited by examiner

TESTING A CRASH SENSOR DEVICE DURING VEHICLE OPERATION

RELATED APPLICATION

This application is a divisional of U.S. patent application Ser. No. 15/491,292, filed Apr. 19, 2017, which is incorporated herein by reference.

BACKGROUND

An airbag system is a type of vehicle safety device designed to inflate during a collision or impact with a surface or a sudden rapid deceleration, in order to provide a vehicle occupant a soft cushioning and restraint during a crash. An airbag system may include an airbag cushion, an inflation module, and a crash sensor device. The crash sensor device may be used to detect a crash.

SUMMARY

In some implementations, a crash sensor device may include a plurality of sensor components positioned along one or more data paths to a communication interface of the crash sensor device. The crash sensor device may include at least one test control unit. The at least one test control unit may receive a test command from an electronic control unit during operation of a vehicle. The at least one test control unit may perform a test of one or more sensor components, of the plurality of sensor components, during operation of the vehicle based on the test command. The at least one test control unit may output a test result to the electronic control unit based on performing the test.

In some implementations, a method may include receiving, by a test control unit of a crash sensor device of a vehicle, a test command to perform a test of the crash sensor device. The test command may be received from an electronic control unit of the vehicle during operation of the vehicle. The crash sensor device may include at least one sensor component. The method may include performing, by the test control unit, a test of the crash sensor device based on receiving the test command. The test may be performed during operation of the vehicle. The method may include outputting, by the test control unit, a test result based on performing the test. The test result may be output to the electronic control unit during operation of the vehicle.

In some implementations, a sensor device may include a first plurality of sensor components to generate a first output, and a second plurality of sensor components to generate a second output. The first plurality of sensor components and the second plurality of sensor components may provide redundancy along different data paths to a communication interface. The sensor device may include a test control unit. The test control unit may perform a first test on the first plurality of sensor components. The second output may be used for control of a system and the first output may not be used for control of the system while the first test is being performed. The first test may be performed during operation of the system. The test control unit may determine that the first test is complete, and may provide an indication that the first test is complete based on determining that the first test is complete. The first output may be used for control of the system after a first settling time has elapsed from completion of the first test. The test control unit may perform a second test on the second plurality of sensor components. The second output may not be used for control of the system and the first output may be used for control of the system while the second test is being performed. The test control unit may determine that the second test is complete, and may provide an indication that the second test is complete based on determining that the second test is complete. The second output may be used for control of the system after a second settling time has elapsed from completion of the second test.

DETAILED DESCRIPTION

The following detailed description of example implementations refers to the accompanying drawings. The same reference numbers in different drawings may identify the same or similar elements.

A crash sensor device of a vehicle may run a startup test after powering up in order to perform a self-test and deliver measurements and/or status information to another system of the vehicle (e.g., a restraint system, an electronic control unit, etc.). In conventional crash sensor devices, once the startup test has passed, the crash sensor device may transmit only regular measurements, and may not perform another self-test without interrupting a power supply to the crash sensor device and/or reinitiating startup of the crash sensor device. However, interrupting the power supply or reinitiating startup would place occupants of the vehicle in a dangerous situation because the crash sensor device would be unable to detect a crash when the crash sensor device is offline during a power supply interruption and/or a startup sequence.

Implementations described herein permit a crash sensor device (or another type of sensor device) to perform a self-test during operation of a vehicle (e.g., after the startup test has passed). The self-test may be performed, for example, after detecting that the vehicle is in a safe driving condition and/or by using multiple crash sensor devices that provide redundancy. In this way, the crash sensor device may be tested during vehicle operation to improve safety, reduce errors, and improve sensor accuracy.

Figure 1:
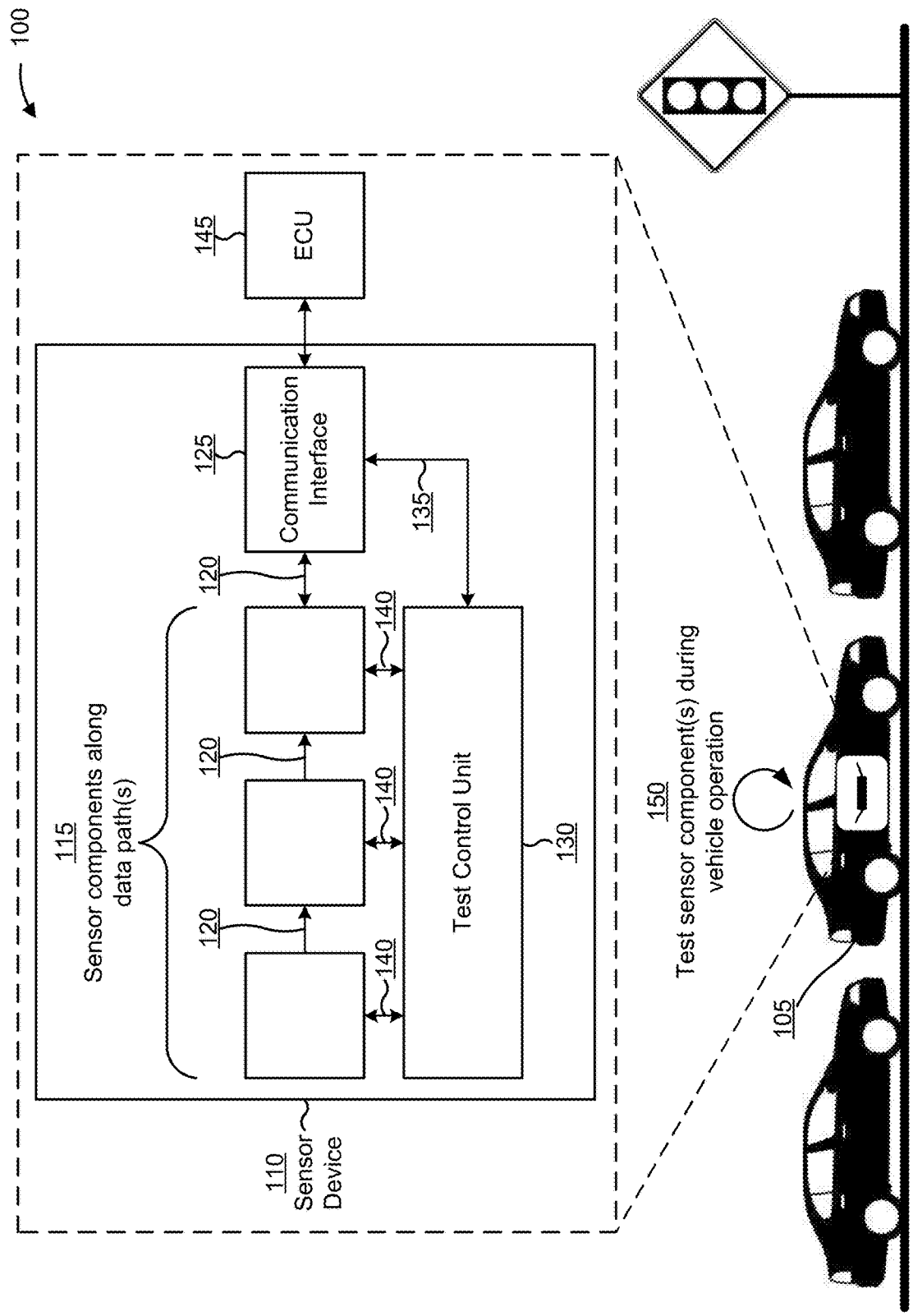
FIG. 1 is a diagram of an overview of an example implementation described herein.

FIG. 1 is a diagram of an overview of an example implementation 100 described herein. As shown in FIG. 1, a vehicle 105 may include a sensor device 110, such as a crash sensor device. The sensor device 110 may include multiple sensor components 115 along one or more data paths 120 to a communication interface 125 of the sensor device 110. A sensor component 115 may include, for example, a sensor element that outputs a signal (e.g., a pressure sensor element, a temperature sensor element, a crash sensor element, an impact sensor element, and/or the like) and/or one or more components to process the signal and/or analyze test results (e.g., an analog-to-digital converter (ADC), a digital-to-analog converter (DAC), a signal processor, a filter, a fast Fourier transform (FFT) component, a regression calculator, a test pattern comparator, a normalization component, a compensation component, a multiplexer, and/or the like). The sensor element may be integrated with the other sensor components 115 in one semiconductor chip. In some implementations, multiple semiconductor chips may be provided in one semiconductor package or on one printed circuit board (PCB), with one semiconductor chip including the sensor element and another semiconductor chip including the other sensor components 115. A data path 120 may include a bus and/or a similar type of communication path to carry signals.

The sensor device 110 may further include a test control unit 130 to test one or more sensor components 115 along the data paths(s) 120. The test control unit 130 may communicate with the communication interface 125 via an internal interface 135 (e.g., a bi-directional interface), and may communicate with one or more sensor components 115 via one or more test paths 140. The sensor device 110 may use the communication interface 125 to communicate with an electronic control unit (ECU) 145 of the vehicle 105 (e.g., to receive a test command to trigger a test of one or more sensor components 115, to output a test result of testing one or more sensor components 115, etc.). In some implementations, the ECU 145 may be external to the sensor device 110.

As shown by reference number 150, the sensor device 110 (e.g., the test control unit 130) may test one or more sensor components 115 during operation of the vehicle 105 (e.g., after the startup test has been completed). For example, the test control unit 130 may receive a test command from the ECU 145 during operation of the vehicle 105 (e.g., via the communication interface 125 and the internal interface 135). The test control unit 130 may perform a test of one or more sensor components 115, during operation of the vehicle, based on receiving the test command from the ECU 145. The test control unit 130 may receive one or more test results of performing the test (e.g., from one or more sensor components 115), and may output the one or more test results to the ECU 145 during operation of the vehicle 105.

In some implementations, the ECU 145 may determine that the vehicle 105 is in a safe driving condition (e.g., by receiving input from one or more sensors, such as a speed sensor, a collision avoidance sensor, e.g. radar, lidar, and/or the like), and may transmit the test command to the sensor device 110 based on determining that the vehicle 105 is in the safe driving condition. Additionally, or alternatively, the sensor device 110 may include redundant sensor components 115 and/or data paths 120, and the sensor device 110 may test a first set of sensor components 115, along a first data path 120, while a second set of sensor components 115, along a second data path 120, provides sensor data to the ECU 145. In this way, the sensor device 110 may perform a self-test without jeopardizing the safety of the vehicle occupant(s), thereby increasing safety, improving accuracy of the sensor device 110, and reducing errors associated with the sensor device 110. Additional details are provided herein.

As indicated above, FIG. 1 is provided as an example. Other examples are possible and may differ from what was described with regard to FIG. 1.

Figure 2:
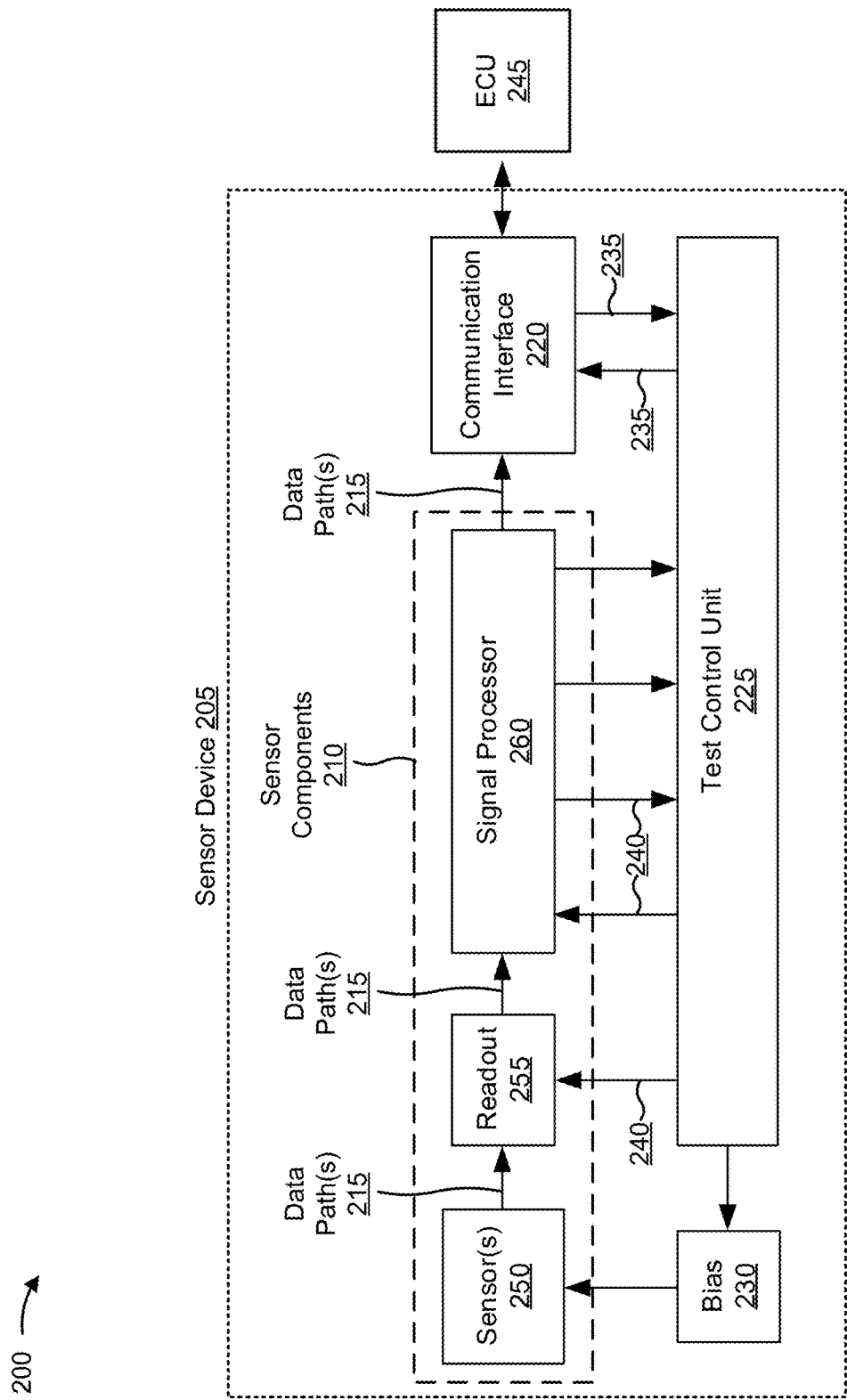
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a sensor device 205, which may include one or more sensor components 210 positioned along one or more data paths 215 to a communication interface 220. As further shown, the sensor device 205 may include a test control unit 225, a bias component 230, one or more internal interfaces 235 between the communication interface 220 and the test control unit 225, and one or more test paths 240 between the test control unit 225 and one or more sensor components 210. As further shown, environment 200 may include an ECU 245 that communicates with the sensor device 205 via the communication interface 220. Devices of environment 200 may interconnect via wired connections, wireless connections, or a combination of wired and wireless connections.

Sensor device 205 includes one or more sensor components 210 positioned along one or more data paths 215 to the communication interface 220 of the sensor device 205. For example, sensor device 205 may include a crash sensor device, which may also be referred to as an impact sensor, an airbag sensor, and/or the like. In some implementations, sensor device 205 may be integrated into a vehicle. Additionally, or alternatively, sensor device 205 may include a test control unit 225 and/or a bias component 230.

Sensor component 210 includes one or more sensors 250 (e.g., sensor elements) to output a signal and/or one or more components to read and/or process the signal, such as readout 255, signal processor(s) 260, and/or the like. For example, sensor 250 may include a sensing element, such as a pressure sensor, a temperature sensor, a speed sensor, an accelerometer, a gyroscope, a crash sensor, an impact sensor, an angle sensor, and/or the like. Sensor 250 may sense an attribute of a physical environment, and may output an electrical signal based on the attribute. Readout 255 may include, for example, an amplifier, an analog-to-digital converter, a sigma-delta converter, and/or the like. Signal processor 260 may include, for example, a filter (e.g., an infinite impulse response filter, a high-pass filter, a low-pass filter, a band-pass filter, and/or the like), a fast Fourier transform (FFT) component, a regression calculator, a test pattern comparator, a linearization component, a compensation component (e.g., a temperature compensation component, a pressure compensation component, and/or the like), a multiplexer, and/or the like.

Data path 215 includes one or more paths to carry signals (e.g., analog signals, digital signals, electrical signals, etc.) from sensor 250 to communication interface 220. For example, data path 215 may include on-chip wiring, PCB-wiring, a wire, a bus, a wireless path (e.g., an air interface), and/or a similar type of component.

In some implementations, sensor device 205 may include a first plurality of sensor components 210 along a first data path 215 to communication interface 220, and a second plurality of sensor components 210 along a second data path 215 to communication interface 220. The first plurality of sensor components 210 and the second plurality of sensor components 210 may provide redundancy (at least along a portion of the data path or fully over the data path). For example, the sensor device 205 may be capable of providing an expected output if sensor components 210 along one of the data paths 215 are deactivated for testing. As used herein, redundant data paths 215 or redundant sets of sensor components 210 may refer to a capability of normal operation of sensor device 205 (e.g., measuring and reporting sensor data for control of one or more systems by ECU 245) if one of the redundant data paths 215 and/or sets of sensor components 210 is under test. Thus, redundant data paths 215 and redundant sets of sensor components 210 need not be identical. For example, redundant data paths 215 and/or sensor components 210 may include numbers and/or types of components (e.g., a successive approximation ADC on a first data path 215 and a sigma-delta ADC on a second data path 215, and/or the like). Additionally, or alternatively, multiple redundant data paths 215 may share one or more sensor components 210, in some implementations.

Communication interface 220 includes an interface for communication between sensor device 205 and ECU 245. For example, communication interface 220 may include a transceiver-like component (e.g., a transceiver and/or a separate receiver and transmitter) that enables sensor device 205 to communicate with other devices (e.g., ECU 245), such as via a wired connection, a wireless connection, or a combination of wired and wireless connections. Communication interface 220 permits sensor device 205 to receive information from another device and/or provide information to another device. For example, communication interface 220 may communicate via a wire, a bus (e.g., a controller area network (CAN) bus, a vehicle area network (VAN) bus, etc.), a wireless path (e.g., an air interface), and/or a similar type of communication path.

Test control unit 225 includes one or more components capable of performing a test of one or more sensor components 210 (e.g., during operation of a vehicle that includes sensor device 205). For example, test control unit 225 may include one or more processors, as described in more detail below. In some implementations, test control unit 225 may receive a test command from ECU 245 during operation of a vehicle, may perform a test of one or more sensor components 210 during operation of the vehicle, and may output a test result to ECU 245 based on performing the test. In some implementations, ECU 245 may generate the test command and/or transmit the test command to sensor device 205 based on a determination that a vehicle, that includes ECU 245 and sensor device 205, is in a safe driving condition. Thus, the test may be performed after performing a startup test at startup of the vehicle, thereby improving safety, reducing errors, and improving sensor accuracy during operation of the vehicle. Additionally, or alternatively, the test may be repeated multiple times after a startup of the vehicle and/or a startup of sensor device 205. For example, the test control unit 225 may perform the test based on a test schedule.

Test control unit 225 may communicate with ECU 245 via an internal interface 235 (e.g., that permits communication between components internal to sensor device 205) and communication interface 220 (e.g., that permits communication between components external from sensor device 205, such as ECU 245). In some implementations, internal interface 235 may be a bi-directional interface. Additionally, or alternatively, test control unit 225 may communicate with one or more sensor components 210 via one or more test paths 240. For example, test control unit 225 may extract data from one or more sensor components 210 via test path(s) 240 during operation of the vehicle, and may generate a test result based on extracting the data. Additionally, or alternatively, test control unit 225 may provide input to one or more sensor components 210 via test path(s) 240 during operation of the vehicle, and may generate a test result based on providing the input.

In some implementations, test control unit 225 may include a source to generate one or more test signals, and may include one or more multiplexers to distribute the test signal(s) to different points along data path 215 (e.g., as input to one or more sensor components 210). Additionally, or alternatively, test control unit 225 may include one or more data sinks to receive one or more test results, via one or more multiplexers, from different points along data path 215 (e.g., as output from one or more sensor components 210). For example, test control unit 225 may distribute test signal(s) to and/or receive test results from one or more sensors 250, one or more readouts 255, one or more signal processors 260, and/or the like. In some implementations, the test control unit 225 may perform a self-test of one or more signal processors 260 using a scan chain.

In some implementations, sensor device 205 may include multiple test control units 225. In some implementations, at least one test control unit 225 may be integrated into at least one of the sensor components 210 included in sensor device 205. In this way, a self-test may be performed quickly, thereby reducing the amount of time that sensor components 210 are deactivated and improving safety.

Bias component 230 includes one or more components that supply a reference voltage to sensor(s) 250. For example, bias component 230 may include a direct current (DC) voltage source, such as a battery. In some implementations, test control unit 225 may perform a test of one or more sensor components 210 without interrupting power to the one or more sensor components 210. In this way, the test may be performed during operation of the vehicle, thereby improving safety, reducing errors, and improving sensor accuracy during operation of the vehicle.

ECU 245 includes an embedded system of the vehicle that controls one or more other systems of the vehicle, such as an electrical system or subsystem. ECU 245 may control, for example, a restraint system, an airbag system, and/or a collision detection system of the vehicle. For example, ECU 245 may receive one or more signals from sensor device 205, and may use the signal(s) to determine whether to deploy an airbag (e.g., based on detecting a crash event). In some implementations, ECU 245 may control one or more other systems of the vehicle, such as an engine system, a powertrain system, a transmission system, a brake system, a suspension system, a power door system, a power window system, a power steering system, a speed system, a telematics system, a collision avoidance system, and/or the like. ECU 245 may use one or more signals from sensor device 205 to control such systems.

In some implementations, test control unit 225 includes one or more processors implemented in hardware, firmware, or a combination of hardware and software. A processor includes a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, the processor is capable of being programmed to perform a function. Additionally, or alternatively, test control unit 225 may include memory, such as a random access memory (RAM), a read only memory (ROM), and/or another type of dynamic or static storage device (e.g., a flash memory, a magnetic memory, and/or an optical memory) that stores information and/or instructions for use by the processor.

Test control unit 225 (and/or one or more other components of sensor device 205) may perform one or more processes described herein. Test control unit 225 may perform these processes by executing software instructions stored by a non-transitory computer-readable medium, such as a memory described above. A computer-readable medium may be an example of a non-transitory memory device. A memory device includes memory space within a single physical storage device or memory space spread across multiple physical storage devices. Software instructions may be read into memory from another computer-readable medium or from another device (e.g., ECU 245) via communication interface 220. When executed, software instructions stored in the memory may cause a processor of test control unit 225 to perform one or more processes described herein. Additionally, or alternatively, hardwired circuitry can be used in place of or in combination with software instructions to perform one or more processes described herein. Thus, implementations described herein are not limited to any specific combination of hardware circuitry and software.

The number and arrangement of components shown in FIG. 2 are provided as an example. In practice, there can be additional components, fewer components, different components, or differently arranged components than those shown in FIG. 2. Furthermore, two or more components shown in FIG. 2 can be implemented within a single component, or a single component shown in FIG. 2 can be implemented as multiple, distributed components. Additionally, or alternatively, a set of components (e.g., one or more devices) of environment 200 can perform one or more functions described as being performed by another set of components of environment 200.

Figure 3:
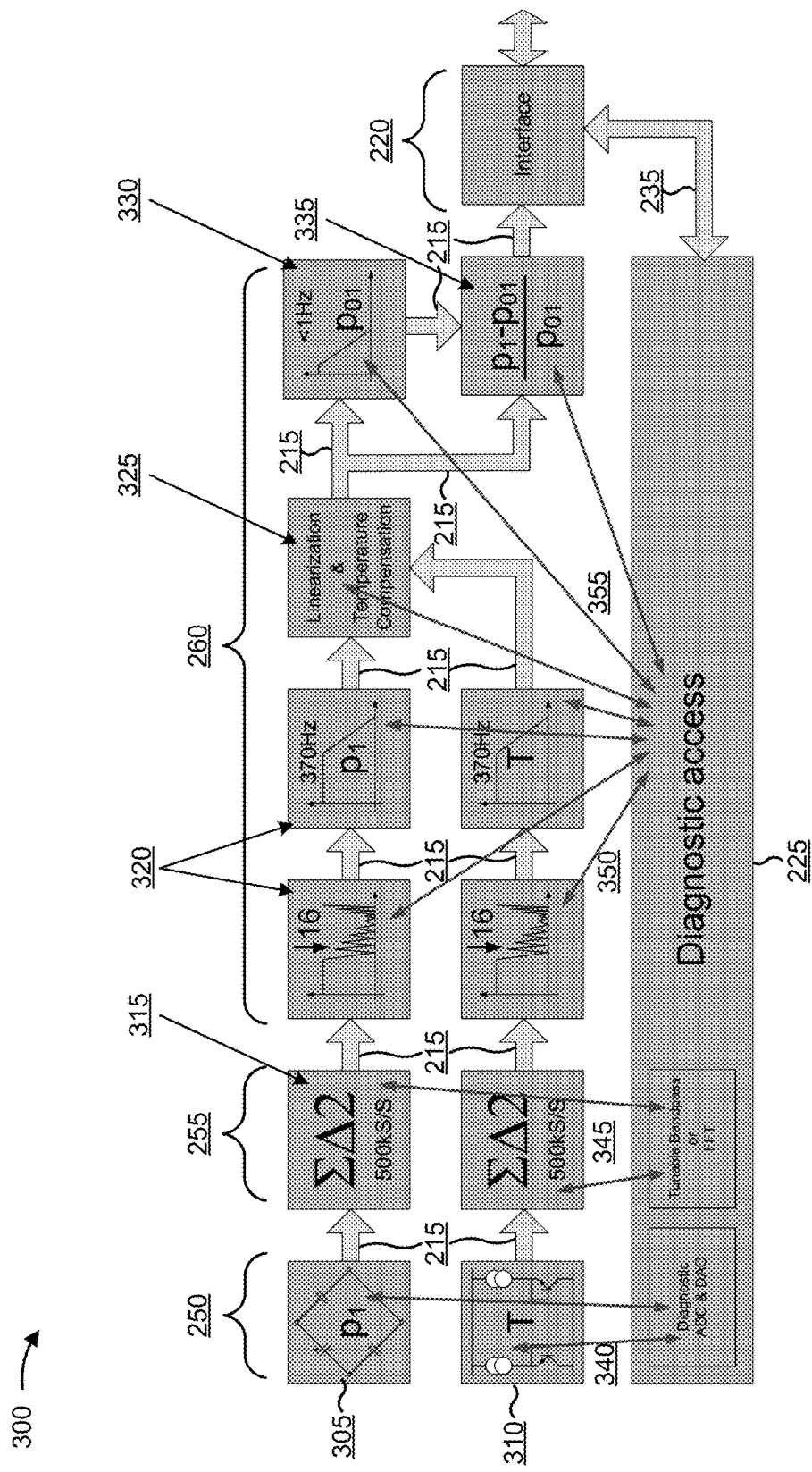
FIGS. 3 and 4 are diagrams of example components of a crash sensor device.

FIG. 3 is a diagram of example components of a crash sensor device 300, which may correspond to sensor device 205. As shown in FIG. 3, crash sensor device 300 may include one or more components described above in connection with FIG. 2, such as sensor components 210 (e.g., sensors 250, readouts 255, signal processors 260, etc.), data path(s) 215, communication interface 220, test control unit 225, and internal interface 235.

FIG. 3 shows a crash sensor device 300 that does not provide redundancy along different data paths 215 to communication interface 220. Although FIG. 3 shows two data paths 215, with one that originates with a pressure sensor 305 and one that originates with a temperature sensor 310, processed signals from these sensors are read and converted by sigma-delta converters 315, processed by filters 320, and combined at a linearization and temperature compensation component 325. The measurements from the multiple data paths 215 are combined to generate individual samples, which are filtered by a filter 330 and analyzed (e.g., using multiple samples over time) by a crash detection component 335. Thus, the multiple data paths 215 do not provide redundancy. In this case, in order to improve safety when crash sensor device 300 does not provide redundancy, ECU 245 may generate a test command based on a determination that the vehicle is in a safe driving condition.

In some implementations, test control unit 225 may input test signal(s) to and/or receive test result(s) from a first point 340 along data path(s) 215. The first point 340 may correspond to a sensor 250. For example, test control unit 225 may adjust a voltage of a sensor, may insert an offset value, and/or the like, and may analyze a test result based on such input to determine whether the test result matches an expected test result. Test control unit 225 may change a configuration of sensor 250, may output a test result (e.g., an indication that a test passed, an indication that a test failed, an indication of an obtained measurement, etc.), and/or the like, based on determining whether the test result matches the expected test result. In some implementations, test control unit 225 may use a diagnostic ADC, a diagnostic DAC, and/or the like to perform such tests of sensors 250.

Additionally, or alternatively, test control unit 225 may input test signal(s) to and/or receive test result(s) from a second point 345 along data path(s) 215. The second point 345 may correspond to a readout 255. For example, test control unit 225 may modify a transfer function (e.g., a sigma-delta transfer function) of an ADC, may modify a gain value, and/or the like, and may analyze a test result based on such input to determine whether the test result matches an expected test result. Test control unit 225 may change a configuration of sensor readout 255, may output a test result (e.g., an indication that a test passed, an indication that a test failed, an indication of an obtained measurement, etc.), and/or the like, based on determining whether the test result matches the expected test result. In some implementations, test control unit 225 may use a tunable bandpass filter, a fast Fourier transform component, and/or the like to perform such tests of readout 255.

Additionally, or alternatively, test control unit 225 may input test signal(s) to and/or receive test result(s) from a third point 350 along data path(s) 215. The third point 350 may correspond to a signal processor 260, such as a filter. For example, test control unit 225 may apply a test function and/or the like, and may analyze a test result based on such input to determine whether the test result matches an expected test result. Test control unit 225 may change a configuration of signal processor 260, may output a test result (e.g., an indication that a test passed, an indication that a test failed, an indication of an obtained measurement, etc.), and/or the like, based on determining whether the test result matches the expected test result. In some implementations, test control unit 225 may input test signal(s) to and/or receive test result(s) from multiple points corresponding to multiple signal processors 260 along data path(s) 215.

Additionally, or alternatively, test control unit 225 may input test signal(s) to and/or receive test result(s) from a fourth point 355 along data path(s) 215. The fourth point 355 may correspond to another signal processor 260, such as crash detection component 335. For example, test control unit 225 may apply a test function to test a mathematical operation (e.g., subtraction, division, etc.), and may analyze a test result based on such input to determine whether the test result matches an expected test result. Test control unit 225 may change a configuration of signal processor 260, may output a test result (e.g., an indication that a test passed, an indication that a test failed, an indication of an obtained measurement, etc.), etc., based on determining whether the test result matches the expected test result.

When crash sensor device 300 does not provide redundancy, as shown in FIG. 3, test control unit 225 may perform a test of one or more sensor components 210 (e.g., sensor(s) 250, readout(s) 255, signal processor(s) 260) based on a test command generated by ECU 245. The test command may be generated based on a determination that a vehicle, that includes crash sensor device 300, is in a safe driving condition. In this way, test control unit 225 may test crash sensor device 300 during vehicle operation to improve safety, reduce errors, and improve sensor accuracy without placing vehicle occupants in a dangerous situation (e.g., because tests are performed after determining that the vehicle is in a safe driving condition).

As indicated above, FIG. 3 is provided merely as an example. Other examples are possible and may differ from what was described with regard to FIG. 3.

Figure 4:
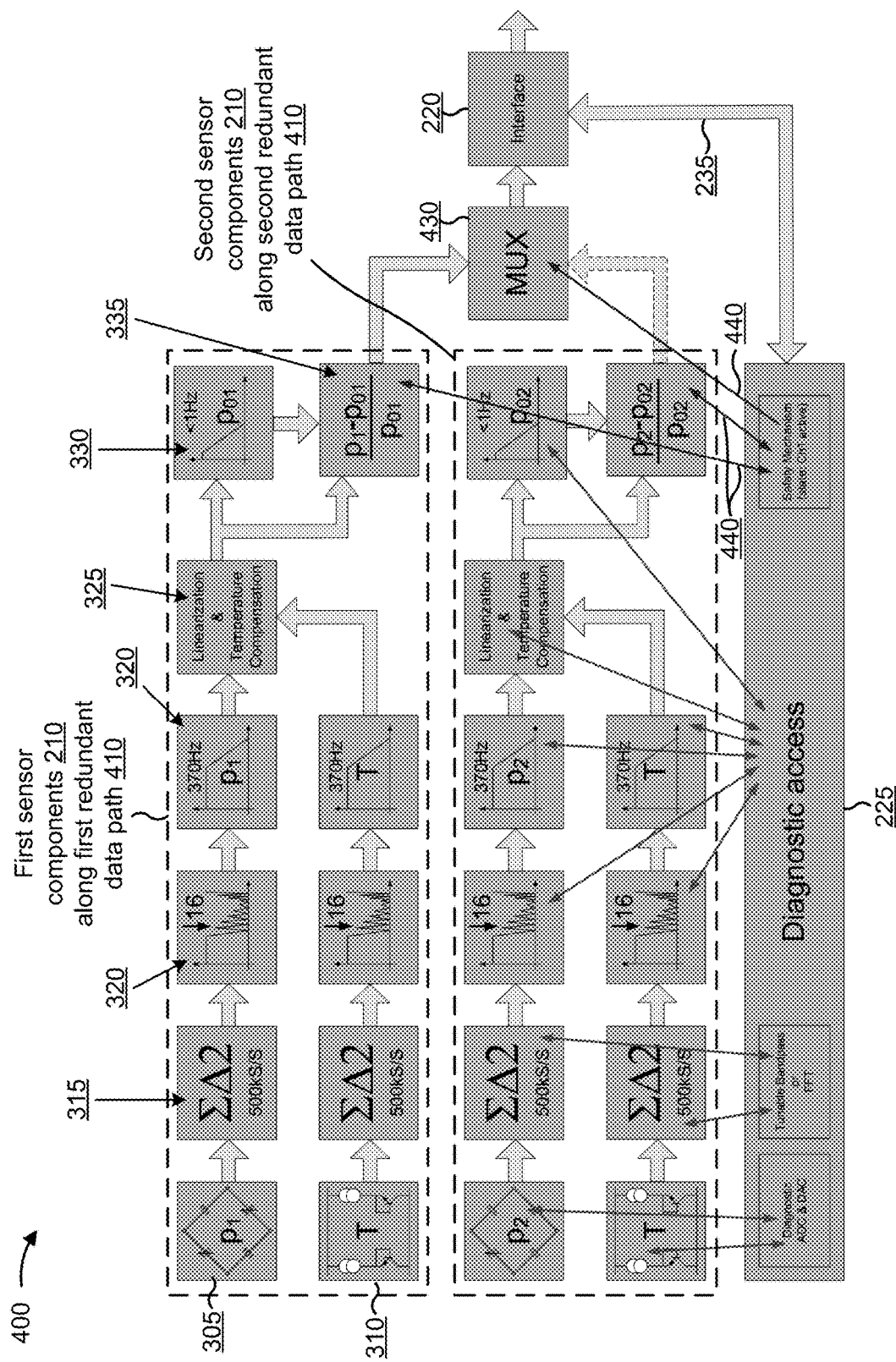

FIG. 4 is a diagram of example components of another crash sensor device 400, which may correspond to sensor device 205. Crash sensor device 400 may include one or more components described above in connection with FIG. 2 and/or FIG. 3, such as sensor components 210 (e.g., sensors 250, readouts 255, signal processors 260, etc.), data path(s) 215, communication interface 220, test control unit 225, internal interface 235, pressure sensors 305, temperature sensors 310, sigma-delta converters 315, filters 320, linearization and temperature compensation components 325, filters 330, crash detection components 335, and/or the like.

FIG. 4 shows a crash sensor device 400 that provides redundancy using first sensor components 210 along a first redundant data path 410 to communication interface 220 and second sensor components 210 along a second redundant data path 420 to communication interface 220. As shown in FIG. 4, each redundant data path may include a first sub-path that originates with a pressure sensor 305 and a second sub-path that originates with a temperature sensor 310. Each sub-path may include a sigma-delta converter 315 and one or more filters 320, and signals from each sub-path may be combined at a linearization and temperature compensation component 325, as described above in connection with FIG. 3. In each data path (e.g., data path 410 and data path 420), the combined signals may be filtered by a filter 330 and analyzed by a crash detection component 335, as described above in connection with FIG. 3. In some implementations, signals from the first redundant data path 410 and the second redundant data path 420 may be multiplexed by a multiplexer 430. Thus, the multiple data paths 410 and 420 provide redundancy. In this case, in order to improve safety when crash sensor device 400 provides redundancy, crash sensor device 400 may test a first data path while outputting signals from a second data path, and the output signals may be used by ECU 245 to control one or more systems of a vehicle.

When crash sensor device 400 includes redundant data paths, test control unit 225 may test one or more sensor components 210 of either data path as described above in connection with FIG. 3. For example, test control unit 225 may input test signal(s) to and/or receive test result(s) from different points along data path 410 and/or 420, such as a point corresponding to a sensor 250, a point 345 corresponding to a readout 255, a point 350 corresponding to a signal processor 260, and/or the like.

Additionally, or alternatively, test control unit 225 may input test signal(s) to and/or receive test result(s) from a point 440 corresponding to an output of crash detection component 335 and/or multiplexer 430. For example, when the crash sensor device 400 includes first sensor components 210 along a first redundant data path 410 and second sensor components 210 along a second redundant data path 420, test control unit 225 may compare a first signal from the first redundant data path 410 and a second signal from the second redundant data path 420. Test control unit 225 may determine whether the first signal and the second signal represent the same signal (e.g., are the same or within a threshold), and may change a configuration of one or more sensor components 210 and/or multiplexer 430, may output a test result (e.g., an indication that a test passed, an indication that a test failed, an indication of an obtained measurement, etc.), and/or the like, based on determining whether the first signal and the second signal represent the same signal. Additionally, or alternatively, test control unit 225 may generate a test result based on an output from an individual data path (e.g., without comparing outputs from redundant data paths).

When crash sensor device 400 provides redundancy, as shown in FIG. 4, test control unit 225 may perform a test of one or more sensor components 210 (e.g., sensor(s) 250, readout(s) 255, signal processor(s) 260) based on a test command generated by ECU 245 and/or according to a test schedule. For example, the first redundant data path 410 may provide a first output and the second redundant data path 420 may provide a second output. Test control unit 225 may perform a first test associated with the first redundant data path 410. While the first test is being performed, the second output from the second redundant data path 420 may be used for control of a system (e.g., may be provided to ECU 245 for control of the system), and the first output may not be used for control of the system. The system may be operating while the first test is being performed.

Similarly, test control unit 225 may perform a second test associated with the second redundant data path 420. While the second test is being performed, the first output from the first redundant data path 410 may be used for control of the system, and the second output may not be used for control of the system. The system may be operating while the second test is being performed. In some implementations, test control unit 225 may determine that the first test is complete and/or that a first settling time has elapsed from completion of the first test before performing the second test. Similarly, test control unit 225 may perform additional tests associated with the first redundant data path 410 and/or the second redundant data path 420 after corresponding first and second settling times have elapsed. In this way, test control unit 225 may test crash sensor device 400 during vehicle operation to improve safety, reduce errors, and improve sensor accuracy without placing vehicle occupants in a dangerous situation (e.g., because the tests are performed on redundant data paths with one data path providing control output and another data path providing test output).

As indicated above, FIG. 4 is provided merely as an example. Other examples are possible and may differ from what was described with regard to FIG. 4.

Figure 5:
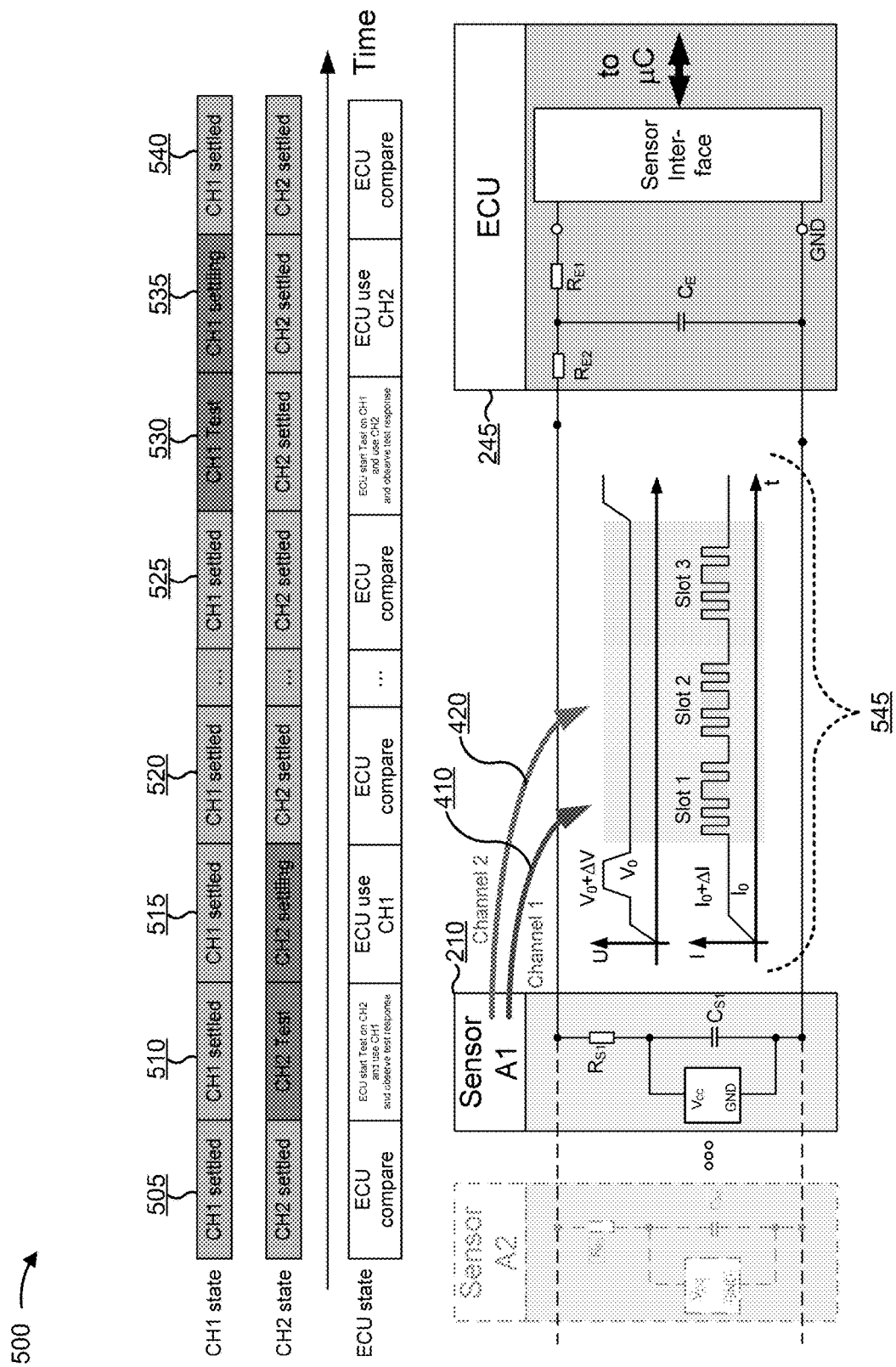
FIG. 5 is a diagram of an example implementation relating to testing a crash sensor device during vehicle operation.

FIG. 5 is a diagram of an example implementation 500 relating to testing a crash sensor device 400 during vehicle operation. Example implementation 500 relates to testing a crash sensor device 400 that provides redundancy using a first redundant data path 410 (shown as channel 1 (CH1) in FIG. 5) and a second redundant data path 420 (shown as channel 2 (CH2) in FIG. 5), as described above in connection with FIG. 4.

As shown in FIG. 5, during a first time period 505, sensor device 205 may provide, to ECU 245, output signals from both redundant data paths (e.g., individually or multiplexed together by a multiplexer 430) to control a system. During the first time period 505, test control unit 225 may compare the output signals from the redundant data paths. In some implementations, if test control unit 225 determines that the output signals do not represent the same signal (e.g., the output signals differ by a threshold amount), then test control unit 225 may trigger tests of the redundant data paths (e.g., sequentially), as described below.

During a second time period 510, test control unit 225 may test the second redundant data path 420 while sensor device 205 provides output from the first redundant data path 410 to ECU 245 to control a system of a vehicle. In some implementations, test control unit 225 may perform the test of the second redundant data path 420 based on determining that the output signals from the first redundant data path 410 and the second redundant data path 420 do not represent the same signal.

After performing the test, sensor device 205 may wait until a settling time, associated with the second redundant data path 420, has elapsed, as shown by time period 515. During the settling time, the sensor device 205 may continue to provide output from the first redundant data path 410 to ECU 245 to control the system of the vehicle. During the time periods 510 and 515, sensor device 205 may prevent output from the second redundant data path 420 from being provided to ECU 245 and/or ECU 245 may discard input received via the second redundant data path 420. In this way, output from the first redundant data path 410 may be used to control a system of the vehicle while the second redundant data path 420 is being tested, thereby improving safety. As further shown, after the settling time has elapsed (during time period 520), sensor device 205 may provide, to ECU 245, output signals from both redundant data paths (e.g., individually or multiplexed together by a multiplexer 430).

As shown by time periods 525-540, test control unit 225 may test the first redundant data path 410 in a similar manner as described above. For example, test control unit 225 may test the first redundant data path 410 while sensor device 205 provides output from the second redundant data path 420 to ECU 245 to control a system of the vehicle. In some implementations, test control unit 225 may perform the test of the first redundant data path 410 based on determining that the output signals from the first redundant data path 410 and the second redundant data path 420 do not represent the same signal. After performing the test, sensor device 205 may wait until a settling time, associated with the first redundant data path 410, has elapsed. During the time periods 530 and 535, sensor device 205 may prevent output from the first redundant data path 410 from being provided to ECU 245 and/or ECU 245 may discard input received via the first redundant data path 410. In this way, output from the second redundant data path 420 may be used to control a system of the vehicle while the first redundant data path 410 is being tested, thereby improving safety.

In some implementations, the settling time may be a preconfigured amount of time, and may be the same or different for different redundant data paths. In some implementations, the settling time may be a period of time after which a first output signal from the first redundant data path 410 represents the same signal as (e.g., is within a threshold range of) a second output signal from the second redundant data path 420.

As shown by reference number 545, an example test may include providing a voltage pulse on a data path 215 of sensor device 205 and monitoring test results from different sensor components 210 during different time periods (e.g., shown as slot 1, slot 2, and slot 3). This is just one example of a test that may be performed, and other tests may be performed in addition to or as an alternative to this test. For example, test control unit 225 may perform a test using an ADC output, a filter output, data from a temperature sensor, data from a pressure sensor, data from a DSP register, data from a DSP stack, data from a DSP status register, data stored in memory (e.g., non-volatile memory), data generated by performing a startup test, data from a pulse response, data from a step response, data generated by injecting or overlaying test signals in a data path 215, data generated by configuring one or more parameters of one or more sensor components 210 (e.g., a corner frequency of a filter, an oscillator clock setting, a temperature coefficient, and/or the like), a result of a test calculation routine, a measured test signal generator (e.g., a fixed voltage, a fixed capacitor, etc.), a measured voltage (e.g., a bias voltage, a supply voltage, etc.), a measured current, a measurement from a safety sensor, a self scan, a test routine, a fault pattern, and/or the like.

As indicated above, FIG. 5 is provided merely as an example. Other examples are possible and may differ from what was described with regard to FIG. 5.

Figure 6:
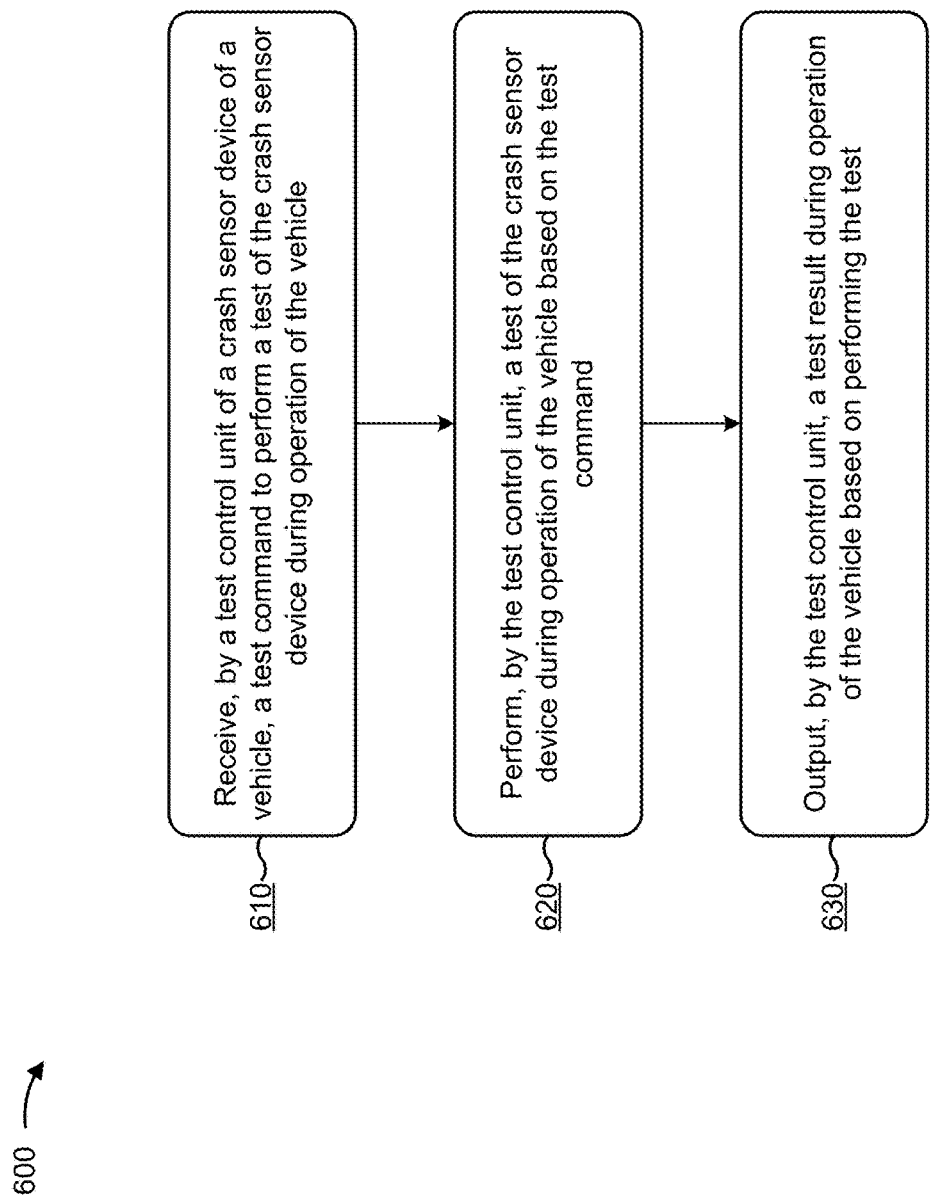
FIG. 6 is a flow chart of an example process for testing a crash sensor device during vehicle operation.

FIG. 6 is a flow chart of an example process 600 for testing a crash sensor device during vehicle operation. In some implementations, one or more process blocks of FIG. 6 may be performed by test control unit 225. In some implementations, one or more process blocks of FIG. 6 may be performed by another device or a group of devices separate from or including test control unit 225, such as ECU 245 and/or one or more other components of sensor device 205, crash sensor device 300, and/or crash sensor device 400.

As shown in FIG. 6, process 600 may include receiving, by a test control unit of a crash sensor device of a vehicle, a test command to perform a test of the crash sensor device during operation of the vehicle (block 610). For example, a test control unit may receive a test command to perform a test of a sensor device during operation of a vehicle. In some implementations, the test command is received from an ECU based on a determination that the vehicle is in a safe driving condition. Additionally, or alternatively, the test control unit may perform the test based on a test schedule. In some implementations, the test control unit is integrated into a sensor component of the sensor device.

In some implementations, the sensor device includes a plurality of sensor components positioned along one or more data paths to a communication interface of the sensor device. In some implementations, the plurality of sensor components includes a first plurality of sensor components, positioned along a first data path of the one or more data paths, and a second plurality of sensor components positioned along a second data path of the one or more data paths.

As further shown in FIG. 6, process 600 may include performing, by the test control unit, a test of the crash sensor device during operation of the vehicle based on the test command (block 620). For example, the test control unit may perform a test of the sensor device during operation of the vehicle based on receiving the test command. In some implementations, the test is performed after performing a startup test at startup of the vehicle. Additionally, or alternatively, the test is repeated multiple times after a startup of the sensor device. Additionally, or alternatively, the test is performed without interrupting power to the one or more sensor components.

In some implementations, the test control unit may perform the test by extracting data from a sensor component based on the test command, and may generate the test result based on extracting the data. Additionally, or alternatively, the test control unit may perform the test by providing input to a sensor component based on the test command, and may generate the test result based on providing the input.

In some implementations, the test control unit includes one or more processors to analyze a plurality of test results. In some implementations, the test control unit performs a self-test of the one or more processors using a scan chain.

In some implementations, the test control unit may include a source to generate a plurality of test signals and one or more multiplexers to distribute the plurality of test signals to different points along the one or more data paths. Additionally, or alternatively, the test control unit may include a plurality of data sinks to receive a plurality of test results, via one or more multiplexers, from a plurality of points along the one or more data paths.

As further shown in FIG. 6, process 600 may include outputting, by the test control unit, a test result during operation of the vehicle based on performing the test (block 630). For example, the test control unit may output a test result during operation of the vehicle based on performing the test. In some implementations, the test control unit may compare a first signal from the first data path and a second signal from the second data path, and may determine whether the first signal and the second signal represent the same signal based on comparing the first signal and the second signal.

In some implementations, the test control unit may receive a first output from a first plurality of sensor components included in the crash sensor device, and may receive a second output from a second plurality of sensor components included in the crash sensor device. The first plurality of sensor components and the second plurality of sensor components may provide redundancy. The test control unit may compare the first output and the second output, and may generate the test result based on comparing the first output and the second output.

In some implementations, the test control unit may receive a first output, from a first plurality of sensor components included in the crash sensor device, or a second output from a second plurality of sensor components included in the crash sensor device. The first plurality of sensor components and the second plurality of sensor components may provide redundancy. The test control unit may generate the test result based on the first output or the second output.

In some implementations, the sensor device may include a first plurality of sensor components to generate a first output and a second plurality of sensor components to generate a second output. The first plurality of sensor components and the second plurality of sensor components may provide redundancy along different data paths to a communication interface. The sensor device may include a test control unit. The test control unit may perform a first test on the first plurality of sensor components, where the second output is to be used for control of a system and the first output is not to be used for control of the system while the first test is being performed, and where the first test to be performed during operation of the system. The test control unit may determine that the first test is complete, and may provide an indication that the first test is complete based on determining that the first test is complete, where the first output is to be used for control of the system after a first settling time has elapsed from completion of the first test. The test control unit may perform a second test on the second plurality of sensor components, where the second output is not to be used for control of the system and the first output is to be used for control of the system while the second test is being performed. The test control unit may determine that the second test is complete, and may provide an indication that the second test is complete based on determining that the second test is complete, where the second output to be used for control of the system after a second settling time has elapsed from completion of the second test.

In some implementations, the first settling time and the second settling time are preconfigured amounts of time. In some implementations, at least one of the first settling time or the second settling time is a period of time after which a first signal, from the first plurality of sensor components, and a second signal, from the second plurality of sensor components, are within a threshold range of one another. Additionally, or alternatively, the test control unit may determine that the first output and the second output differ by a threshold amount, and may perform the test based on determining that the first output and the second output differ by the threshold amount. In some implementations, the sensor device is a crash sensor device of a vehicle.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Implementations described herein permit a crash sensor device (or another type of sensor device) to perform a self-test during operation of a vehicle (e.g., after the startup test has passed). The self-test may be performed, for example, after detecting that the vehicle is in a safe driving condition and/or by using multiple crash sensor devices that provide redundancy. In this way, the crash sensor device may be tested during vehicle operation to improve safety, reduce errors, and improve sensor accuracy.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related items, and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A sensor device, comprising:
    a first plurality of sensor components configured to generate a first output;
    a second plurality of sensor components configured to generate a second output,
        the first plurality of sensor components and the second plurality of sensor components providing redundancy along different data paths to a communication interface; and a test control processor configured to:
compare the first output and the second output;
trigger a performance of a first test on the first plurality of sensor components based on the first output and the second output differing by a threshold amount, the second output to be used for control of a system and the first output not to be used for control of the system while the first test is being performed, the first test to be performed during operation of the system;
determine that the first test is complete;
provide an indication that the first test is complete based on determining that the first test is complete, the first output to be used for control of the system after a first settling time has elapsed from completion of the first test;
trigger a performance of a second test on the second plurality of sensor components based on the first output and the second output differing by the threshold amount, the second output not to be used for control of the system and the first output to be used for control of the system while the second test is being performed;
determine that the second test is complete; and
provide an indication that the second test is complete based on determining that the second test is complete, the second output to be used for control of the system after a second settling time has elapsed from completion of the second test.

2. The sensor device of claim 1, wherein the first settling time and the second settling time are preconfigured amounts of time.

3. The sensor device of claim 1, wherein at least one of the first settling time or the second settling time is a period of time after which a first signal, from the first plurality of sensor components, and a second signal, from the second plurality of sensor components, are within a threshold range of one another.

4. The sensor device of claim 1, wherein the test control processor is configured to trigger the performance of the first test based on at least one of:
a test command received from an electronic control unit, or
a test schedule.

5. The sensor device of claim 1, wherein the test control processor is further configured to:
determine that the first output and the second output differ by the threshold amount.

6. The sensor device of claim 1, wherein the sensor device is a crash sensor device of a vehicle.

7. The sensor device of claim 1, wherein the first test is performed after performing a startup test of the system.

8. A method, comprising:
comparing, by a device, a first output generated by a first plurality of sensor components and a second output generated by a second plurality of sensor components;
trigger, by the device, a performance of a first test on the first plurality of sensor components based on the first output and the second output differing by a threshold amount,
wherein the first plurality of sensor components and the second plurality of sensor components provide redundancy along different data paths to a communication interface, and
wherein the second output is to be used for control of a system and the first output is not to be used for control of the system while the first test is being performed,
the first test to be performed during operation of the system;
determining, by the device, that the first test is complete;
providing, by the device, an indication that the first test is complete based on determining that the first test is complete,
wherein the first output is to be used for control of the system after a first settling time has elapsed from completion of the first test;
trigger, by the device, a performance of a second test on the second plurality of sensor components based on the first output and the second output differing by the threshold amount,
wherein the second output is not to be used for control of the system and the first output is to be used for control of the system while the second test is being performed;
determining, by the device, that the second test is complete; and
providing, by the device, an indication that the second test is complete based on determining that the second test is complete,
wherein the second output is to be used for control of the system after a second settling time has elapsed from completion of the second test.

9. The method of claim 8, wherein the first settling time and the second settling time are preconfigured amounts of time.

10. The method of claim 8, wherein at least one of the first settling time or the second settling time is a period of time after which a first signal, from the first plurality of sensor components, and a second signal, from the second plurality of sensor components, are within a threshold range of one another.

11. The method of claim 8, wherein triggering the performance of the first test comprises:
triggering the performance of the first test based on at least one of:
a test command received from an electronic control unit, or
a test schedule.

12. The method of claim 8, further comprising:
determining that the first output and the second output differ by the threshold amount.

13. The method of claim 8, wherein the device is a crash sensor device of a vehicle.

14. The method of claim 8, wherein the first test is performed after performing a startup test of the system.

15. A non-transitory computer-readable medium storing instructions, the instructions comprising:
one or more instructions, when executed by one or more processors, cause the one or more processors to:
compare a first output generated by a first plurality of sensor components and a second output generated by a second plurality of sensor components;
trigger a performance of a first test on the first plurality of sensor components based on the first output and the second output differing by a threshold amount,
wherein the first plurality of sensor components and the second plurality of sensor components provide redundancy along different data paths to a communication interface, and wherein the second output is to be used for control of a system and the first output is not to be used for control of the system while the first test is being performed,
   the first test to be performed during operation of the system;
determine that the first test is complete;
provide an indication that the first test is complete based on determining that the first test is complete,
   the first output to be used for control of the system after a first settling time has elapsed from completion of the first test;
trigger a performance of a second test on the second plurality of sensor components based on the first output and the second output differing by the threshold amount,
   the second output not to be used for control of the system and the first output to be used for control of the system while the second test is being performed;
determine that the second test is complete; and
provide an indication that the second test is complete based on determining that the second test is complete,
   the second output to be used for control of the system after a second settling time has elapsed from completion of the second test.

16. The non-transitory computer-readable medium of claim 15, wherein the first settling time and the second settling time are preconfigured amounts of time.

17. The non-transitory computer-readable medium of claim 15, wherein at least one of the first settling time or the second settling time is a period of time after which a first signal, from the first plurality of sensor components, and a second signal, from the second plurality of sensor components, are within a threshold range of one another.

18. The non-transitory computer-readable medium of claim 15, wherein the one or more instructions, that cause the one or more processors to trigger the performance of the first test, cause the one or more processors to:
   trigger the performance of the first test based on at least one of:
      a test command received from an electronic control unit, or
      a test schedule.

19. The non-transitory computer-readable medium of claim 15, wherein the one or more instructions, when executed by the one or more processors, further cause the one or more processors to:
   determine that the first output and the second output differ by the threshold amount.

20. The non-transitory computer-readable medium of claim 15, wherein the first test is performed after performing a startup test of the system.

* * * * *